(12) United States Patent
Schwindt

(10) Patent No.: US 10,571,909 B2
(45) Date of Patent: Feb. 25, 2020

(54) AUTONOMOUS DISTRESS TRACKING DEVICE

(71) Applicant: GE Aviation Systems Limited, Glouchestershire (GB)

(72) Inventor: Stefan Alexander Schwindt, Cheltenham (GB)

(73) Assignee: GE Aviation Systems Limited, Gloucestershire (GB)

( * ) Notice: Subject to any disclaimer, the term of this patent is extended or adjusted under 35 U.S.C. 154(b) by 0 days.

(21) Appl. No.: 15/978,217

(22) Filed: May 14, 2018

(65) Prior Publication Data

US 2018/0364706 A1 Dec. 20, 2018

(30) Foreign Application Priority Data

Jun. 19, 2017 (GB) .................................. 1709709.8

(51) Int. Cl.
*G05D 1/00* (2006.01)
*H04W 4/029* (2018.01)
(Continued)

(52) U.S. Cl.
CPC ........... *G05D 1/0055* (2013.01); *B64D 45/00* (2013.01); *H04W 4/029* (2018.02); *H04W 4/42* (2018.02);
(Continued)

(58) Field of Classification Search
CPC .......... B64D 2045/0065; B64C 39/024; G05D 1/0055; G05D 1/0676; G05D 1/104;
(Continued)

(56) References Cited

U.S. PATENT DOCUMENTS 9,602,187 B2 * 3/2017 Jacobs ............... H04B 7/18508
2003/0056491 A1 * 3/2003 Coleman ............. F02D 41/3005
60/39.281

(Continued)

OTHER PUBLICATIONS

Pichavant: "Aircraft Tracking & Flight Data Recovery—The Aircraft Manufacturer View" by Claude Pichavant, , Royal Aeronautical Society/Airbus, Apr. 2016, 32 pages, https://www.aerosociety.com/Assets/Docs/Events/Conferences/2016/813/1.airbus.pdf, (Year: 2016).*

(Continued)

*Primary Examiner* — Stephen R Burgdorf
(74) *Attorney, Agent, or Firm* — Dority & Manning, P.A.

(57) ABSTRACT

One example aspect of the present disclosure relates to a method. The method can include determining, by one or more autonomous distress tracking (ADT) devices installed in a designated fire zone, a state of the vehicle. When the state of the vehicle is the normal state, the method can include transmitting first data via a first transmitter at a first interval, wherein the first transmitter is configured to transmit messages over a frequency band used for normal communications. When the state of the vehicle is the possible distress state, the method can include transmitting second data via the first transmitter at a second interval. When the state of the vehicle is the distress state, the method can include transmitting third data continuously via a second transmitter, wherein the second transmitter is configured to transmit messages over a frequency band reserved for emergency communications.

17 Claims, 6 Drawing Sheets

(51) Int. Cl.
  *H04W 4/44* (2018.01)
  *B64D 45/00* (2006.01)
  *H04W 4/90* (2018.01)
  *H04W 4/42* (2018.01)
(52) U.S. Cl.
  CPC ............... *H04W 4/44* (2018.02); *H04W 4/90* (2018.02); *B64D 2045/0065* (2013.01)
(58) Field of Classification Search
  CPC .... G08G 1/161; G08G 5/0013; G08G 5/0069; G08G 5/04; G08G 5/045; H04M 1/72538; H04W 4/029; H04W 4/44; H04W 4/90
  USPC .......................................................... 340/981
  See application file for complete search history.

(56) References Cited

U.S. PATENT DOCUMENTS

| | | | | |
|---|---|---|---|---|
| 2016/0236790 | A1* | 8/2016 | Knapp | B64C 11/001 |
| 2017/0082455 | A1* | 3/2017 | Adler | B64D 45/00 |
| 2017/0106997 | A1* | 4/2017 | Bekanich | G08B 25/006 |
| 2017/0132943 | A1* | 5/2017 | Moon | H04W 4/029 |
| 2017/0248676 | A1* | 8/2017 | Murphy | B64D 45/00 |
| 2017/0248701 | A1* | 8/2017 | Adler | G01S 19/17 |
| 2018/0299530 | A1* | 10/2018 | Polynin | G01S 5/0231 |

OTHER PUBLICATIONS

Hof: "Global Aeronautical Distress & Safety System (GADSS)—Concept of Operation", Version 6.0, by Henk Hof, ICAO GADSS Advisory Group, Jun. 7, 2017, https://www.icao.int/safety/globaltracking/Documents/GADSS%20Concept%20of%20Operations%20-%20Version%206.0%20-%2007%20June%202017.pdf, 52 pages, (Year: 2017).*

Hof: "Adhoc Working Group on Aircraft Tracking—Revised Report", by Henk Hof (AHWG chairman), et al. ICAO, Jun. 12, 2015, https://www.icao.int/safety/globaltracking/Documents/AHWG%20Report%20on%20Aircraft%20Tracking%20Concept%20of%20Operations%20-V5%20Final.pdf, (Year: 2015).*

* cited by examiner

AUTONOMOUS DISTRESS TRACKING DEVICE

FIELD

The present subject matter relates generally to an aerial vehicle.

BACKGROUND

An aerial vehicle can include one or more emergency locator transmitters (ELTs). When an aerial vehicle fails to arrive at an expected destination, a search and rescue team can be dispatched. The search and rescue team can be aided by signals from the one or more ELTs onboard the aerial vehicle. A bad actor may tamper with the one or more ELTs. The search and rescue team may receive no data or bad data from an ELT that has been tampered with.

BRIEF DESCRIPTION

Aspects and advantages of embodiments of the present disclosure will be set forth in part in the following description, or may be learned from the description, or may be learned through practice of the embodiments.

One example aspect of the present disclosure relates to an aerial vehicle. The aerial vehicle can include an avionic system. The aerial vehicle can include one or more autonomous distress tracking (ADT) devices installed in a designated fire zone. The one or more ADT devices can include a first transmitter configured to transmit messages over a frequency band used for normal communications. The one or more ADT devices can include a second transmitter configured to transmit messages over a frequency band reserved for emergency communications. The one or more ADT devices can be configured to determine a state of the aerial vehicle, wherein the state of the aerial vehicle is one of: a normal state, a possible distress state, and a distress state. When the state of the aerial vehicle is the normal state, the one or more ADT devices can be configured to transmit first data via the first transmitter at a first interval. When the state of the aerial vehicle is the possible distress state, the one or more ADT devices can be configured to transmit second data via the first transmitter at a second interval. When the state of the aerial vehicle is the distress state, the one or more ADT devices can be configured to transmit third data continuously via the second transmitter.

Another aspect of the present disclosure relates to a system for beaconing for vehicle recovery. The system can include one or more autonomous distress tracking (ADT) devices installed in a designated fire zone. The one or more ADT devices can include a first transmitter configured to transmit messages over a frequency band used for normal communications. The one or more ADT devices can include a second transmitter configured to transmit messages over a frequency band reserved for emergency communications. The one or more ADT devices can be configured to determine a state of the vehicle, wherein the state of the vehicle is one of: a normal state, a possible distress state, and a distress state. When the state of the vehicle is the normal state, the one or more ADT devices can be configured to transmit first data via the first transmitter at a first interval. When the state of the vehicle is the possible distress state, the one or more ADT devices can be configured to transmit second data via the first transmitter at a second interval. When the state of the vehicle is the distress state, the one or more ADT devices can be configured to transmit third data continuously via the second transmitter.

Another aspect of the present disclosure relates to a method for beaconing for vehicle recovery. The method can include determining, by one or more autonomous distress tracking (ADT) devices installed in a designated fire zone, a state of the vehicle. The state of the vehicle can be one of: a normal state, a possible distress state, and a distress state. When the state of the vehicle is the normal state, the method can include transmitting first data via a first transmitter at a first interval, wherein the first transmitter is configured to transmit messages over a frequency band used for normal communications. When the state of the vehicle is the possible distress state, the method can include transmitting second data via the first transmitter at a second interval. When the state of the vehicle is the distress state, the method can include transmitting third data continuously via a second transmitter, wherein the second transmitter is configured to transmit messages over a frequency band reserved for emergency communications.

Other example aspects of the present disclosure are directed to systems, methods, aerial vehicles, avionics systems, devices, non-transitory computer-readable media for beaconing for vehicle recovery. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
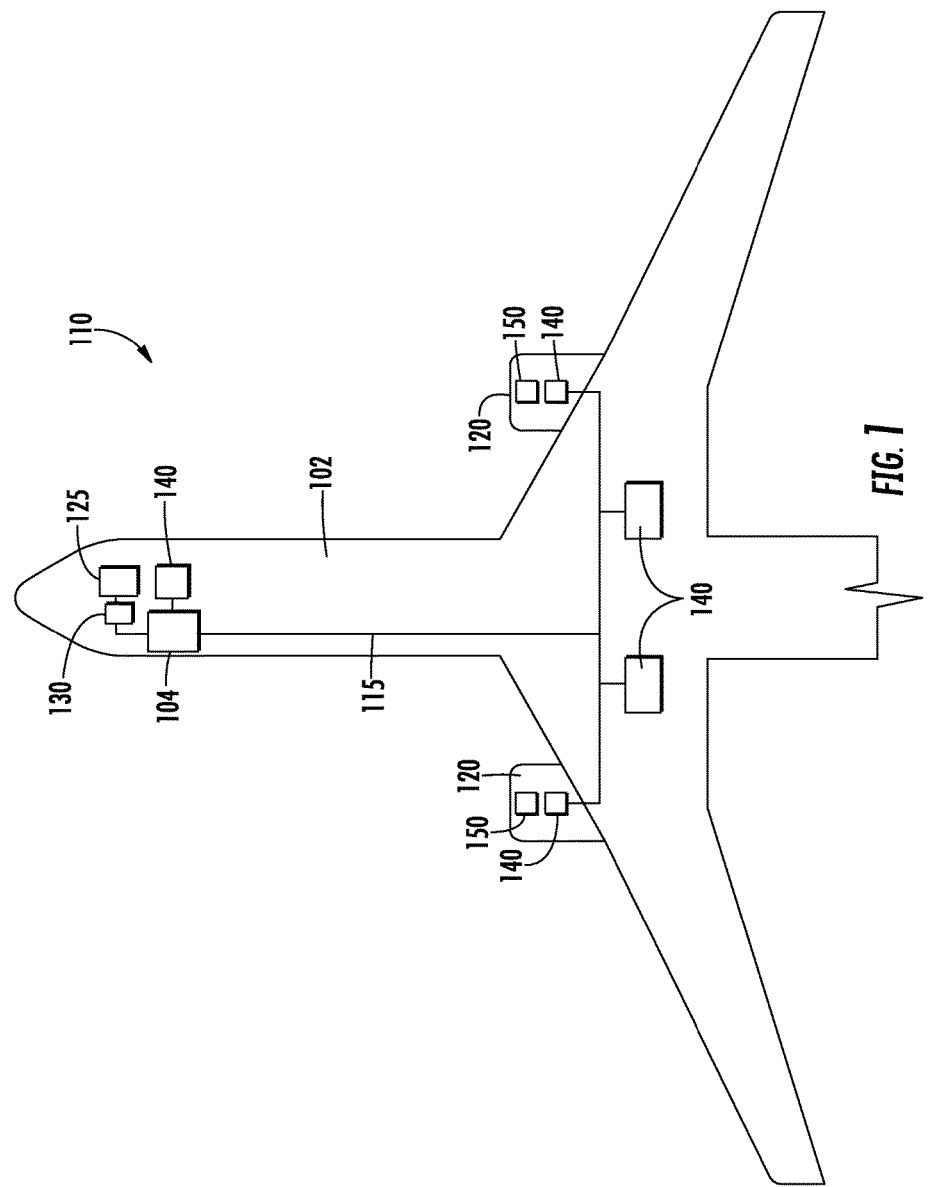
FIG. 1 depicts an aerial vehicle according to example embodiments of the present disclosure.

Reference now will be made in detail to embodiments, one or more examples of which are illustrated in the drawings. Each example is provided by way of explanation of the embodiments, not limitation of the embodiments. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

An aerial vehicle can include one or more designated fire zones. A designated fire zone can be an area of the aerial vehicle that is designed to withstand and/or contain an extremely hot fire. Generally, passengers and crew should not be able to access the one or more designated fire zones while the aerial vehicle is in flight. Example designated fire zones include an engine assembly, a nacelle, a fairing, etc.

The aerial vehicle can include one or more autonomous distress tracking (ADT) devices. The one or more ADT devices can be mounted in one or more of the one or more designated fire zones. The one or more ADT devices can be located proximate to one or more full authority digital engine controls (FADECs). The one or more ADT devices can utilize a same power source as the one or more FADECs. The one or more ADT devices can receive power without use of a circuit breaker.

The one or more ADT devices can include a communication interface for communicating with each other and other avionic systems. The one or more ADT devices can receive an identifier associated with the aerial vehicle via the communication interface. The one or more ADT devices can receive a first set of location coordinates via the communication interface. The first set of location coordinates can include global positioning system (GPS) coordinates. The one or more ADT devices can include or be in communication with a secondary location system. The secondary location system can be a GPS system. The one or more ADT devices can receive a second set of location coordinates via the secondary location system. The first set of location coordinates can include GPS coordinates.

The one or more ADT devices can include a first transmitter for standard beaconing. The one or more ADT devices can transmit the identifier associated with the aerial vehicle and other information via the first transmitter at a first interval during normal operation. For example, the first interval can be 15 minutes. The one or more ADT devices can transmit the identifier associated with the aerial vehicle and other information via the first transmitter at a second interval during possible distress situation. For example, the second interval can be 1 minute.

The one or more ADT devices can include a second transmitter for distress signaling. The one or more ADT devices can continuously transmit the identifier associated with the aerial vehicle and other information via the second transmitter during a confirmed distress situation. The second transmitter can transmit over a frequency band reserved for emergency communications. For instance, 406 MHz, 121.5 MHz, and 243 MHz can be examples of frequency bands that are reserved for emergency communications. A confirmed distress situation can include, for example, one of the one or more ADT devices losing power from a primary power source (a strong indication that an associated engine has lost power), more than one of the one or more ADT devices losing power from a primary power source (a strong indication that multiple associated engines have lost power), all of the one or more ADT devices losing power from a primary power source (a strong indication that all engines have lost power), when the first set of location coordinates do not match the second set of location coordinates, etc.

In this way, the systems and methods according to example aspects of the present disclosure can have a number of technical effects and benefits. For instance, example aspects of the present disclosure have a technical effect of reducing computational resources needed to locate an aerial vehicle that fails to arrive at its intended destination.

In some embodiments, the systems and methods of the present disclosure also provide an improvement to a computation system. For example, the systems and methods can determine a state of the aerial vehicle, wherein the state of the aerial vehicle is one of: a normal state, a possible distress state, and a distress state; when the state of the aerial vehicle is the normal state, transmit data via a first transmitter at a first interval, wherein the first transmitter is configured to transmit messages over a frequency band used for normal communications; when the state of the aerial vehicle is the possible distress state, transmit data via the first transmitter at a second interval; and when the state of the aerial vehicle is the distress state, transmit data continuously via a second transmitter, wherein the second transmitter is configured to transmit messages over a frequency band reserved for emergency communications. This can reduce computational resources needed to locate an aerial vehicle that fails to arrive at its intended destination.

FIG. 1 depicts an example system for beaconing for vehicle recovery according to example embodiments of the present disclosure. As shown, the system can include an aerial vehicle 102. The aerial vehicle 102 can include an onboard computing system 110. As shown in FIG. 1, the onboard computing system 110 can include one or more onboard computing device(s) 104 that can be associated with, for instance, an avionics system. The avionics system can include or be in communication with a location system, for example. The location system can include a global positioning system (GPS), inertial reference systems, and the like. The onboard computing device(s) 104 can be coupled to a variety of systems on the aerial vehicle 102 over a communications network 115. The communications network 115 can include a data bus or combination of wired and/or wireless communication links.

The onboard computing device(s) 104 can be in communication with a display system 125 including one or more display device(s) that can be configured to display or otherwise provide information generated or received by the system 110 to flight crew members of the aerial vehicle 102. The display system 125 can include a primary flight display, a multipurpose control display unit, or other suitable flight displays commonly included within a cockpit of the aerial vehicle 102.

The onboard computing device(s) 104 can also be in communication with a flight control computer 130. The flight control computer 130 can, among other things, automate the tasks of piloting and tracking the flight plan of the aerial vehicle 102. The flight control computer 130 can include or be associated with, any suitable number of individual microprocessors, power supplies, storage devices, interface cards, auto flight systems, flight management computers, and other standard components. The flight control computer 130 can include or cooperate with any number of software programs (e.g., flight management programs) or instructions designed to carry out the various methods, process tasks, calculations, and control/display functions necessary for operation of the aerial vehicle 102. The flight control computer 130 is illustrated as being separate from the onboard computing device(s) 104. Those of ordinary skill in the art, using the disclosures provided herein, will understand that the flight control computer 130 can also be included with or implemented by the onboard computing device(s) 104.

The onboard computing device(s) 104 can also be in communication with one or more aerial vehicle control system(s) 140. The aerial vehicle control system(s) 140 can be configured to perform various aerial vehicle operations and control various settings and parameters associated with the aerial vehicle 102. For instance, the aerial vehicle control system(s) 140 can be associated with one or more engine(s) 120 and/or other components of the aerial vehicle 102. The aerial vehicle control system(s) 140 can include, for instance, digital control systems, throttle systems, inertial reference systems, flight instrument systems, engine control systems, auxiliary power systems, fuel monitoring systems, engine vibration monitoring systems, communications systems, flap control systems, flight data acquisition systems, and other systems.

The aerial vehicle can include a datalink protocol for communicating over satellite, very high frequency (VHF) radio, and/or high frequency (HF) radio, such as an aircraft communications addressing and reporting system (ACARS). The aerial vehicle can include one or more autonomous distress tracking (ADT) devices 150, described in more detail in FIGS. 2A-2C. The one or more ADT devices 150 can be located in one or more designated fire zones of the aerial vehicle 102. For example, the one or more ADT devices 150 can be located in one or more nacelles of the aerial vehicle 102. In another example, the one or more ADT devices 150 can be located on the one or more engine(s) 120 of the aerial vehicle 102. In yet another example, the one or more ADT devices 150 can be located in one or more fairings of the aerial vehicle 102.

The numbers, locations, and/or orientations of the components of example aerial vehicle 102 are for purposes of illustration and discussion and are not intended to be limiting. Those of ordinary skill in the art, using the disclosures provided herein, shall understand that the numbers, locations, and/or orientations of the components of the aerial vehicle 102 can be adjusted without deviating from the scope of the present disclosure.

Figure 2A:
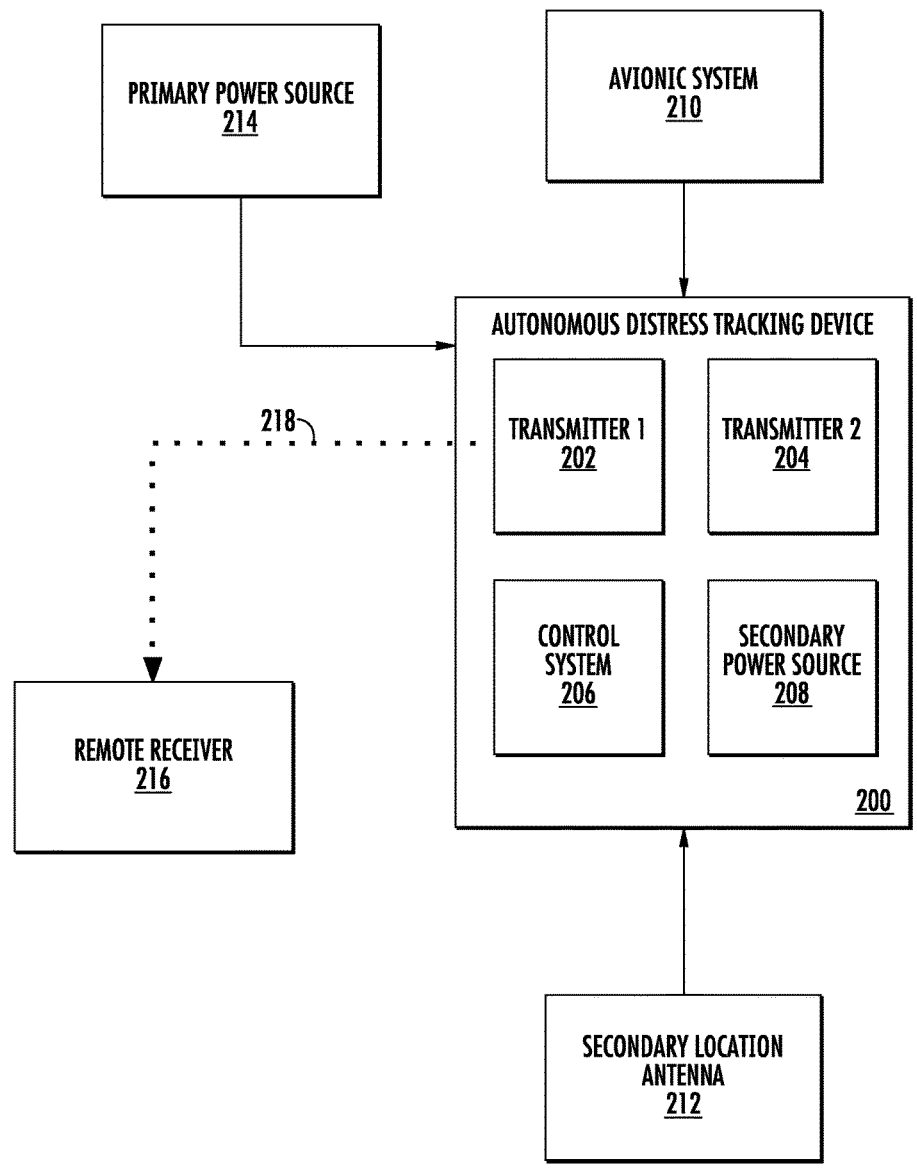
FIG. 2A depicts a block diagram of an autonomous distress tracking (ADT) device according to example embodiments of the present disclosure.
Figure 2B:
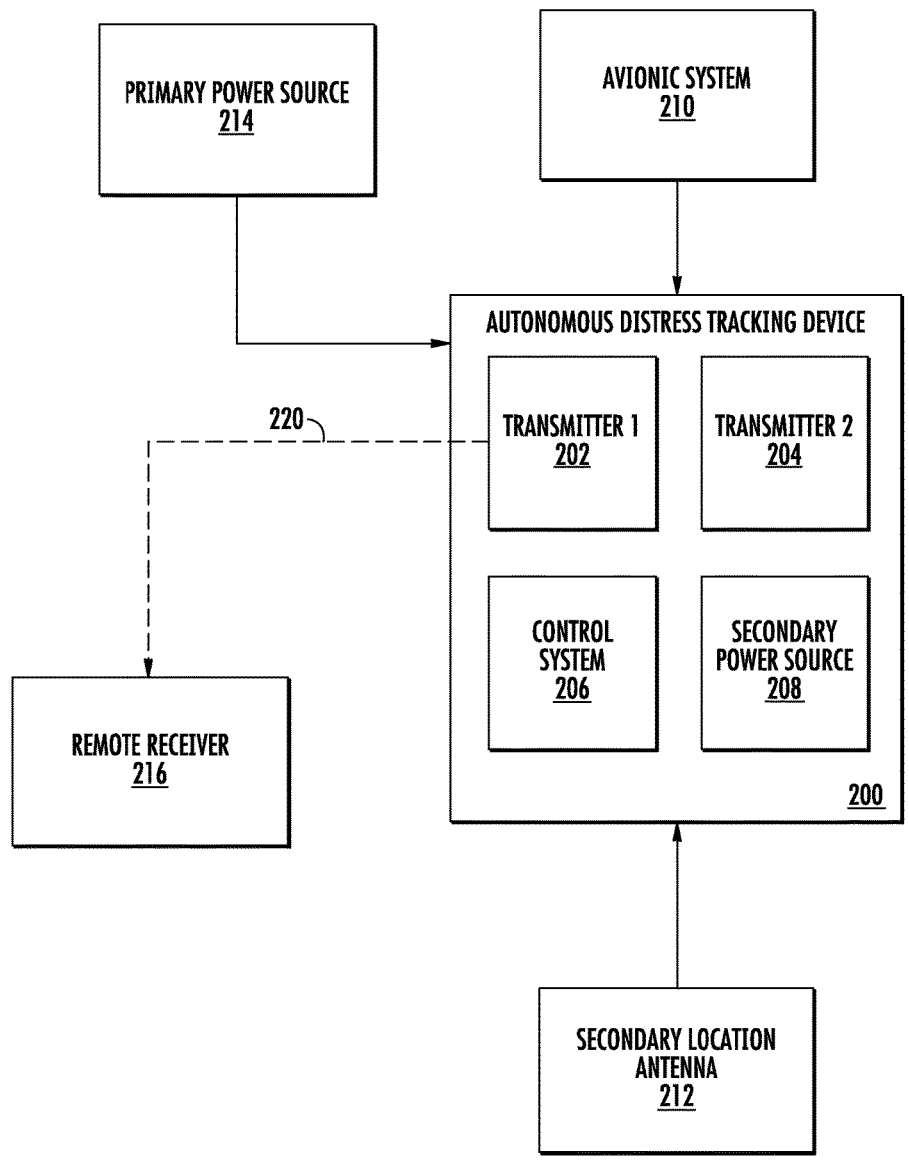
FIG. 2B depicts a block diagram of an ADT device according to example embodiments of the present disclosure.
Figure 2C:
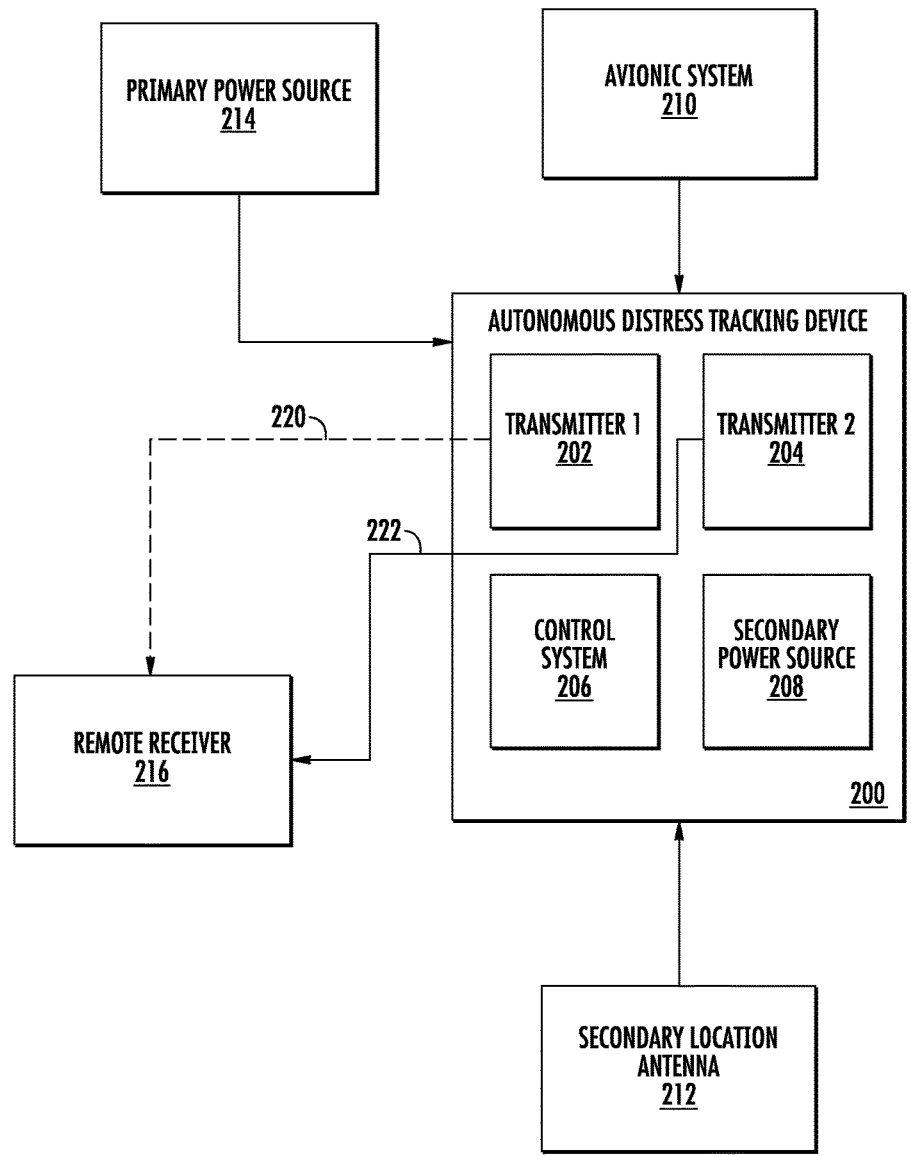
FIG. 2C depicts a block diagram of an ADT device according to example embodiments of the present disclosure.

FIGS. 2A-2C depict block diagrams of an autonomous distress tracking (ADT) device 200 according to example embodiments of the present disclosure. The ADT device 200 can include a first transmitter 202. The first transmitter 202 can be configured to transmit messages over a frequency band used for normal communications. The first transmitter 202 can transmit data over the frequency band used for normal communications. The data transmitted over the frequency band used for normal communications can include: a unique identifier associated with the aerial vehicle, location information (such as location coordinates), error/anti-hacking measures (such as hashes and/or cyclic redundancy check (CRC) information), flight information (such as altitude, direction, speed), a distress code (a code that indicates the reason for the distress signal), etc. The ADT device 200 can include a second transmitter 204. The second transmitter 204 can transmit data over the frequency band reserved for emergency communications. The data transmitted over the frequency band reserved for emergency communications can include: a country of origin, a unique 15 digit hexadecimal code, an encoded identification (such as an aircraft registration or a 24-bit international civil aviation organization (ICAO) address), GPS coordinates, a field indicating if a 121.5 MHz homing transmitter is available, a unique identifier associated with the aerial vehicle, flight information (such as altitude, direction, speed), etc.

Figure 4:
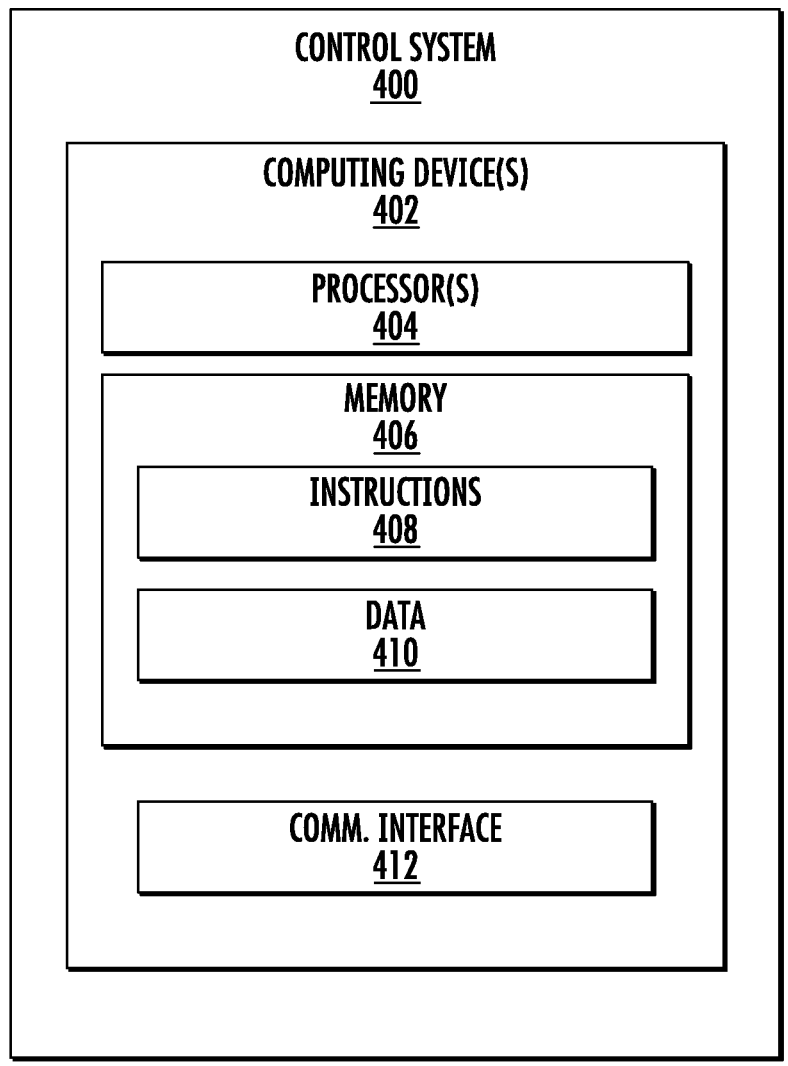
FIG. 4 depicts a control system for implementing one or more aspects according to example embodiments of the present disclosure.

The ADT device 200 can include a control system 206, such as the control system 400 described in FIG. 4. The ADT device 200 can draw power from a primary power source 214. The primary power source 214 can be in communication with a gearbox of an engine and/or an electrical generator connected to and/or integrated with the gearbox. The primary power source 214 can also provide power to a full authority digital engine control (FADEC). The ADT device 200 can include a secondary power source 208. The secondary power source 208 can power the ADT device 200 when the ADT device 200 is unable to draw power from the primary power source 214. The secondary power source 208 can include a battery. The secondary power source 208 can include a fuel cell.

The ADT device 200 and/or the control system 206 can be in communication with an avionic system 210. The ADT device 200 and/or the control system 206 can, for example, receive a first set of location coordinates from the avionic system 210. The first set of location coordinates can include global positioning system (GPS) coordinates. In an embodiment, the ADT device 200 can communicate with other ADT devices via the avionic system 210. In another embodiment, the ADT device 200 can communicate with other ADT devices via a wired or wireless communication interface of the control system 206. The ADT device 200 can be in communication with a secondary location antenna 212. The secondary location antenna 212 can include, for example, a GPS antenna. The ADT device 200 and/or the control system 206 can get the first set of location coordinates from a primary location system, such as through the avionic system 210. The ADT device 200 and/or the control system 206 can receive a second set of location coordinates from a secondary location antenna 212. The second set of location coordinates can include GPS coordinates. The ADT device 200 and/or the control system 206 can determine a state of the aerial vehicle. For example, the ADT device 200 and/or the control system 206 can determine the state of the aerial vehicle based on an ability to draw power (for example, if the ADT device 200 and/or the control system 206 draws power from an engine and it can no longer draw power, then the engine may be out), a comparison of the first set of location coordinates and the second set of location coordinates, a signal from the avionic system, etc. The ADT device 200 can transmit one or more beacons based on the determined state of the aerial vehicle, which will be explained in further detail below. A remote receiver 216, such as a receiver on a search and rescue vehicle, can receive the one or more beacons.

Turning to FIG. 2A, an aerial vehicle in a normal state is shown. When an aerial vehicle is determined to be in a normal state, the ADT device 200 can transmit a first beacon 218 from the first transmitter 202 at a first interval. The first beacon 218 can include first data. In an aspect, the first data can include: a unique identifier associated with the aerial vehicle, location information (such as location coordinates), error/anti-hacking measures (such as hashes and/or cyclic redundancy check (CRC) information), flight information (such as altitude, direction, speed), etc. The first interval can be, for example, 15 minutes. Turning to FIG. 2B, an aerial vehicle in a possible distress state is shown. When an aerial vehicle is determined to be in a possible distress state, the ADT device 200 can transmit a second beacon 220 from the first transmitter 202 at a second interval. The second beacon 220 can include second data. In an aspect, the second data can include: a unique identifier associated with the aerial vehicle, a unique identifier associated with the aerial vehicle, location information (such as location coordinates), error/anti-hacking measures (such as hashes and/or cyclic redundancy check (CRC) information), flight information (such as altitude, direction, speed), a distress code (a code that indicates the reason for the possible distress signal), etc. The second interval can be, for example, 1 minute.

Turning to FIG. 2C, an aerial vehicle in a distress state is shown. When an aerial vehicle is determined to be in a distress state, the ADT device 200 can transmit the second beacon 220 from the first transmitter 202 at the second interval and a third beacon 222 continuously from the second transmitter 204. The third beacon 222 can include third data. In an aspect, the third data can include: a country of origin, a unique 15 digit hexadecimal code, an encoded identification (such as an aircraft registration or a 24-bit international civil aviation organization (ICAO) address), GPS coordinates, a field indicating if a 121.5 MHz homing transmitter is available, a unique identifier associated with the aerial vehicle, flight information (such as altitude, direction, speed), etc.

Figure 3:
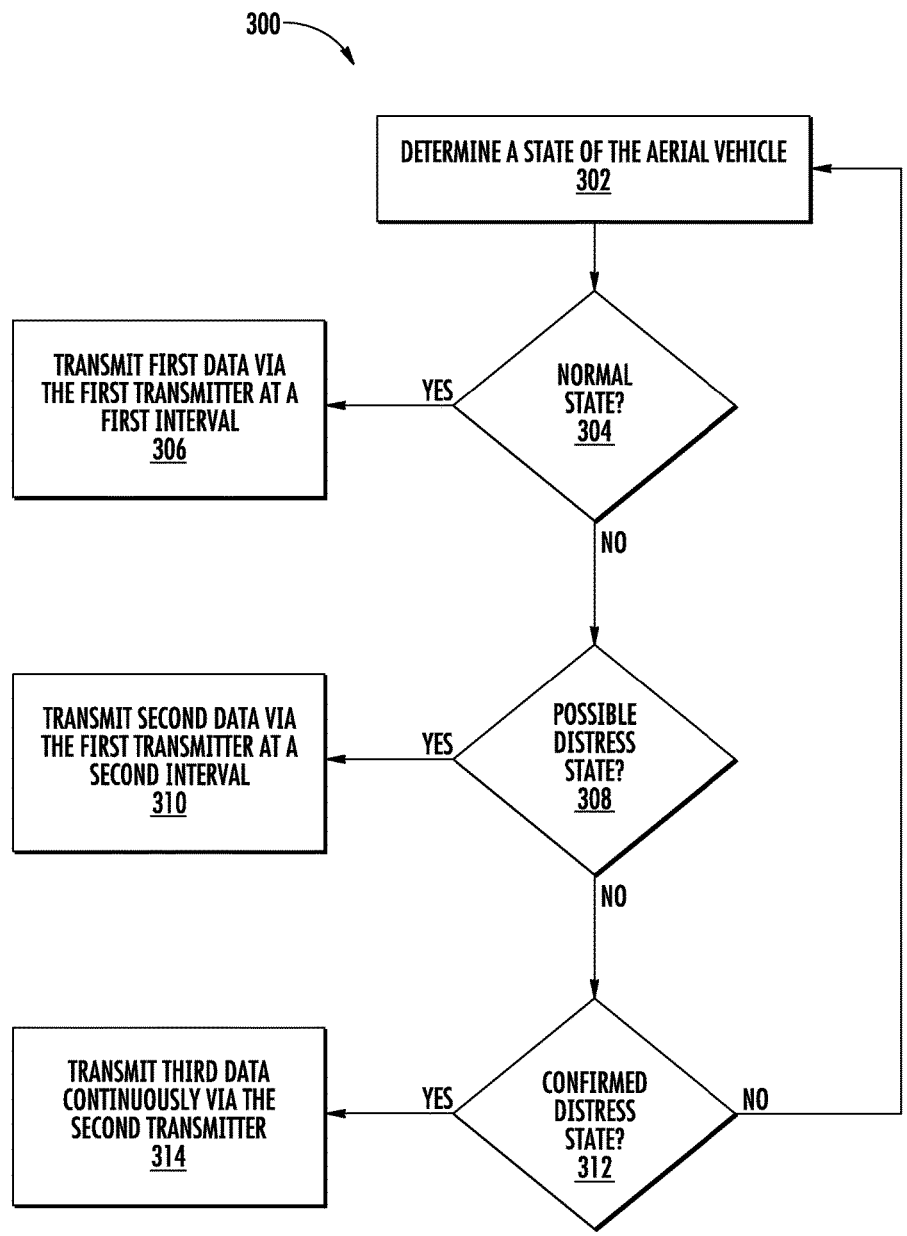
FIG. 3 depicts a flow diagram of an example method according to example embodiments of the present disclosure.

FIG. 3 depicts a flow diagram of an example method 300 for beaconing for vehicle recovery. The method of FIG. 3 can be implemented using, for instance, the autonomous distress tracking (ADT) device 200 of FIG. 2 or the control system 400 of FIG. 4. FIG. 3 depicts steps performed in a particular order for purposes of illustration and discussion. Those of ordinary skill in the art, using the disclosures provided herein, will understand that various steps of any of the methods disclosed herein can be adapted, modified, rearranged, performed simultaneously or modified in various ways without deviating from the scope of the present disclosure.

At (302), a state of an aerial vehicle can be determined. For example, the ADT device 200 installed in a designated fire zone of the aerial vehicle and/or the control system 400 of the ADT device 200 can determine a state of an aerial vehicle. The state of the aerial vehicle can be one of: a normal state, a possible distress state, and a distress state. The designated fire zone can include an engine, a nacelle, or a fairing. In an embodiment, a first set of location coordinates can be received from the avionic system. For example, the ADT device 200 installed in a designated fire zone of the aerial vehicle and/or the control system 400 of the ADT device 200 can receive a first set of location coordinates from the avionic system. The first set of location coordinates can include, for example, global positioning system (GPS) coordinates. In a further embodiment, a second set of location coordinates from a secondary location antenna. For example, the ADT device 200 installed in a designated fire zone of the aerial vehicle and/or the control system 400 of the ADT device 200 can receive a second set of location coordinates from a secondary location system. The second set of location coordinates can include, for example, GPS coordinates. The secondary location antenna can include a GPS antenna. In yet a further embodiment, the first set of location coordinates can be compared with the second set of location coordinates. For example, the ADT device 200 installed in a designated fire zone of the aerial vehicle and/or the control system 400 of the ADT device 200 can compare the first set of location coordinates with the second set of location coordinates. In an aspect, the determination of the state of the aerial vehicle is determined at least in part on the comparison of the first set of location coordinates and the second set of location coordinates.

At (304), a determination can be made of if the aerial vehicle is in a normal state. For example, the ADT device 200 installed in a designated fire zone of the aerial vehicle and/or the control system 400 of the ADT device 200 can determine if the aerial vehicle is in a normal state. If the aerial vehicle is in a normal state, the method 300 can move to (306). If the aerial vehicle is not in a normal state, the method 300 can move to (308). At (306), first data can be transmitted via the first transmitter at a first interval. For example, the ADT device 200 installed in a designated fire zone of the aerial vehicle and/or the control system 400 of the ADT device 200 can transmit first data via the first transmitter at a first interval. In an embodiment, the first interval can be 15 minutes, for example. Although 15 minutes is shown, it is to be understood that any interval may be used. In an aspect, when the state of the aerial vehicle is the normal state, the first data can be transmitted through any datalink protocol for communicating over satellite and/or radio, such as an aircraft communications addressing and reporting system (ACARS) of the aerial vehicle. For example, the ADT device 200 installed in a designated fire zone of the aerial vehicle and/or the control system 400 of the ADT device 200 can transmit the first data through any datalink protocol for communicating over satellite and/or radio, such as an ACARS of the aerial vehicle.

At (308), a determination can be made of if the aerial vehicle is in a possible distress state. For example, the ADT device 200 installed in a designated fire zone of the aerial vehicle and/or the control system 400 of the ADT device 200 can determine if the aerial vehicle is in a possible distress state. If the aerial vehicle is in a possible distress state, the method 300 can move to (310). If the aerial vehicle is not in a possible distress state, the method 300 can move to (312). At (310), second data can be transmitted via the first transmitter at a second interval. For example, the ADT device 200 installed in a designated fire zone of the aerial vehicle and/or the control system 400 of the ADT device 200 can transmit second data via the first transmitter at a second interval. In an embodiment, the second interval can be 1 minute, for example. Although 1 minute is shown, it is to be understood that any interval may be used. In an aspect, the first data can include a set of fields and the second data can include the set of fields. The first data can include: a unique identifier associated with the aerial vehicle, location information (such as location coordinates), error/anti-hacking measures (such as hashes and/or cyclic redundancy check (CRC) information), flight information (such as altitude, direction, speed), etc. The second data can include: a unique identifier associated with the aerial vehicle, a unique identifier associated with the aerial vehicle, location information (such as location coordinates), error/anti-hacking measures (such as hashes and/or cyclic redundancy check (CRC) information), flight information (such as altitude, direction, speed), a distress code (a code that indicates the reason for the possible distress signal), etc.

At (312), a determination can be made of if the aerial vehicle is confirmed to be in a distress state. For example, the ADT device 200 installed in a designated fire zone of the aerial vehicle and/or the control system 400 of the ADT device 200 can determine if the aerial vehicle is confirmed to be in a distress state. If the aerial vehicle is confirmed to be in a distress state, the method 300 can move to (314). If the aerial vehicle is not confirmed to be in a distress state, the method 300 can move to (302). At (314), third data can be transmitted continuously via the second transmitter. For example, the ADT device 200 installed in a designated fire zone of the aerial vehicle and/or the control system 400 of the ADT device 200 can transmit third data continuously via the second transmitter. In an embodiment, when the state of the aerial vehicle is the distress state, data can be transmitted via the first transmitter at the second interval. For example, when the state of the aerial vehicle is the distress state, the ADT device 200 installed in a designated fire zone of the aerial vehicle and/or the control system 400 of the ADT device 200 can transmit data via the first transmitter at the second interval. In an aspect, the second transmitter can transmit over a frequency band reserved for emergency communications. For instance, 406 MHz, 121.5 MHz, and 243 MHz can be examples of frequency bands that are reserved for emergency communications. In an aspect, the second transmitter can transmit at a frequency of 406 megahertz. In an aspect, the second transmitter can transmit at a frequency of 121.5 megahertz. In an aspect, the second transmitter can transmit at a frequency of 243 megahertz. In an embodiment, at least one of the first data, the second data, and the third data can include a unique identifier for the aerial vehicle. In a further embodiment, at least one of the first data, the second data, and the third data can include information in addition to the unique identifier for the aerial vehicle. The third data can include: a country of origin, a unique 15 digit hexadecimal code, an encoded identification (such as an aircraft registration or a 24-bit international civil aviation organization (ICAO) address), GPS coordinates, a field indicating if a 121.5 MHz homing transmitter is available, a unique identifier associated with the aerial vehicle, flight information (such as altitude, direction, speed), etc.

Optionally, the aerial vehicle can include one or more full authority digital engine controls (FADECs). Each of the one or more ADT devices can share a primary power source with an associated FADEC. The one or more ADT devices can include a secondary power source. The secondary power source can be a fuel cell. The one or more ADT devices can draw power from the secondary power source when the associated primary power source is unavailable. The one or more ADT devices can include two or more ADT devices. The two or more ADT devices can be configured to communicate with each other. For instance, the two or more ADT devices can be configured to communicate with each other through the avionic system. As another example, the two or more ADT devices can be configured to communicate with each other via a communication bus in communication with the two or more ADT devices. As a further example, the two or more ADT devices can be configured to wirelessly communicate with each other via a wireless communication protocol. In an embodiment, the aerial vehicle can be determined to be in a distress state based at least in part on one of the two or more ADT devices switching from drawing power from the primary power source to the secondary power source. In an embodiment, the aerial vehicle can be determined to be in a distress state based at least in part on more than one of the two or more ADT devices switching from drawing power from the primary power source to the secondary power source. In an embodiment, the aerial vehicle can be determined to be in a distress state based at least in part on all of the two or more ADT devices switching from drawing power from the primary power source to the secondary power source.

FIG. 4 depicts a block diagram of an example control system 400 that can be used to implement methods and systems according to example embodiments of the present disclosure. The autonomous distress tracking (ADT) device of FIGS. 2A-2C, for example, can include the control system 400. As shown, the control system 400 can include one or more computing device(s) 402. The one or more computing device(s) 402 can include one or more processor(s) 404 and one or more memory device(s) 406. The one or more processor(s) 404 can include any suitable processing device, such as a microprocessor, microcontroller, integrated circuit, logic device, or other suitable processing device. The one or more memory device(s) 406 can include one or more computer-readable media, including, but not limited to, non-transitory computer-readable media, RAM, ROM, hard drives, flash drives, or other memory devices.

The one or more memory device(s) 406 can store information accessible by the one or more processor(s) 404, including computer-readable instructions 408 that can be executed by the one or more processor(s) 404. The instructions 408 can be any set of instructions that when executed by the one or more processor(s) 404, cause the one or more processor(s) 404 to perform operations. The instructions 408 can be software written in any suitable programming language or can be implemented in hardware. In some embodiments, the instructions 408 can be executed by the one or more processor(s) 404 to cause the one or more processor(s) 404 to perform operations, such as the operations for beaconing for vehicle recovery, as described with reference to FIG. 3.

The memory device(s) 406 can further store data 410 that can be accessed by the one or more processor(s) 404. For example, the data 410 can include any data used for beaconing for vehicle recovery, as described herein. The data 410 can include one or more table(s), function(s), algorithm(s), model(s), equation(s), etc. for beaconing for vehicle recovery according to example embodiments of the present disclosure.

The one or more computing device(s) 402 can also include a communication interface 412 used to communicate, for example, with the other components of system. The communication interface 412 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aerial vehicle comprising:
   an avionic system;
   one or more full authority digital engine controls (FADECs);
   two or more autonomous distress tracking (ADT) devices configured to communicate with each other and installed in a designated fire zone comprising:
      a first transmitter configured to transmit messages over a frequency band used for normal communications;
      a second transmitter configured to transmit messages over a frequency band reserved for emergency communications;
      wherein each of the two or more ADT devices shares a primary power source with an associated FADEC; and
      wherein the two or more ADT devices are configured to:
         determine a state of the aerial vehicle, wherein the state of the aerial vehicle is one of: a normal state, a possible distress state, and a distress state;
         when the state of the aerial vehicle is the normal state, transmit first data via the first transmitter at a first interval;
         when the state of the aerial vehicle is the possible distress state, transmit second data via the first transmitter at a second interval; and
         when the state of the aerial vehicle is the distress state, transmit third data continuously via the second transmitter.

2. The aerial vehicle of claim 1, wherein when the state of the aerial vehicle is the distress state, the two or more ADT devices are further configured to transmit third data via the first transmitter at the second interval.

3. The aerial vehicle of claim 1, wherein the designated fire zone comprises an engine, a nacelle, or a fairing.

4. The aerial vehicle of claim 1, wherein the two or more ADT devices are further configured to:
   receive a first set of location coordinates from the avionic system;
   receive a second set of location coordinates from a secondary location antenna; and
   compare the first set of location coordinates with the second set of location coordinates.

5. The aerial vehicle of claim 4, wherein the determination of the state of the aerial vehicle is determined at least in part on the comparison of the first set of location coordinates and the second set of location coordinates.

6. The aerial vehicle of claim 1, wherein the two or more ADT devices further comprise a secondary power source, wherein the secondary power source is a fuel cell, and wherein the two or more devices draw power from the secondary power source when the associated primary power source is unavailable.

7. The aerial vehicle of claim 6, wherein the aerial vehicle is determined to be in a distress state based at least in part on one of the two or more ADT devices switching from drawing power from the primary power source to the secondary power source.

8. The aerial vehicle of claim 6, wherein the aerial vehicle is determined to be in a distress state based at least in part on more than one of the two or more ADT devices switching from drawing power from the primary power source to the secondary power source.

9. The aerial vehicle of claim 6, wherein the aerial vehicle is determined to be in a distress state based at least in part on all of the two or more ADT devices switching from drawing power from the primary power source to the secondary power source.

10. The aerial vehicle of claim 1, wherein the second transmitter transmits at a frequency of 406 megahertz.

11. The aerial vehicle of claim 1, wherein the first interval is 15 minutes.

12. The aerial vehicle of claim 1, wherein the second interval is 1 minute.

13. The aerial vehicle of claim 1, wherein the first data comprises a set of fields and wherein the second data comprises the set of fields.

14. The aerial vehicle of claim 1, wherein at least one of the first data, the second data, and the third data comprise a unique identifier for the aerial vehicle.

15. The aerial vehicle of claim 14, wherein at least one of the first data, the second data, and the third data comprise additional information.

16. The aerial vehicle of claim 1, wherein the aerial vehicle further comprises an aircraft communications addressing and reporting system (ACARS) and wherein when the state of the aerial vehicle is the normal state, the two or more ADT devices are further configured to transmit the first data through the ACARS.

17. A system for beaconing for vehicle recovery comprising:
   one or more full authority digital engine controls (FADECs); and
   two or more autonomous distress tracking (ADT) devices configured to communicate with each other and installed in a designated fire zone comprising:
      a first transmitter configured to transmit messages over a frequency band used for normal communications;
      a second transmitter configured to transmit messages over a frequency band reserved for emergency communications;
      wherein each of the two or more ADT devices shares a primary power source with an associated FADEC; and
      wherein the two or more ADT devices are configured to:
         determine a state of the vehicle, wherein the state of the vehicle is one of: a normal state, a possible distress state, and a distress state;
         when the state of the vehicle is the normal state, transmit first data via the first transmitter at a first interval;
         when the state of the vehicle is the possible distress state, transmit second data via the first transmitter at a second interval; and
         when the state of the vehicle is the distress state, transmit third data continuously via the second transmitter.

* * * * *